DUAL CHANNEL MAGNETIC TAPE RECORDER

Filed Oct. 17, 1955 4 Sheets-Sheet 1

INVENTOR.
WILLIAM H. LYON
BY
H. G. Manning
ATTORNEY

Dec. 1, 1959 W. H. LYON 2,915,595

DUAL CHANNEL MAGNETIC TAPE RECORDER

Filed Oct. 17, 1955 4 Sheets-Sheet 2

INVENTOR.
WILLIAM H. LYON
BY
H. G. Manning
ATTORNEY

DUAL CHANNEL MAGNETIC TAPE RECORDER

Filed Oct. 17, 1955 4 Sheets-Sheet 3

INVENTOR.
WILLIAM H. LYON
BY
H. G. Manning
ATTORNEY

Dec. 1, 1959 W. H. LYON 2,915,595

DUAL CHANNEL MAGNETIC TAPE RECORDER

Filed Oct. 17, 1955 4 Sheets-Sheet 4

INVENTOR.
WILLIAM H. LYON
BY
H. G. Manning
ATTORNEY

United States Patent Office 2,915,595

Patented Dec. 1, 1959

2,915,595

DUAL CHANNEL MAGNETIC TAPE RECORDER

William H. Lyon, Orange, Conn., assignor to The Soundscriber Corporation, New Haven, Conn., a corporation of Connecticut

Application October 17, 1955, Serial No. 540,938

8 Claims. (Cl. 179—100.2)

This invention relates to sound recording and reproducing apparatus, and more particularly to a long playing apparatus with interrupted magnetic tracks in which the sound is recorded on a wide slowly moving flexible strip of tape coated on one side with an emulsion of magnetic particles.

One object of the present invention is to provide a dual recording and reproducing apparatus of the above nature, having two sets of interrupted successive straight sound tracks which are simultaneously impressed laterally upon a moving tape by a plurality of transducer heads carried by two pairs of rotating drums mounted on a shaft extending longitudinally with respect to said tape.

A further object is to provide an apparatus of the above nature which will be simple in construction, inexpensive to manufacture, easy to install and manipulate, compact, ornamental in appearance and very efficient and durable in use.

With these and other objects in view there has been illustrated on the accompanying drawing one form in which the invention may conveniently be embodied in practice.

Figure 1:
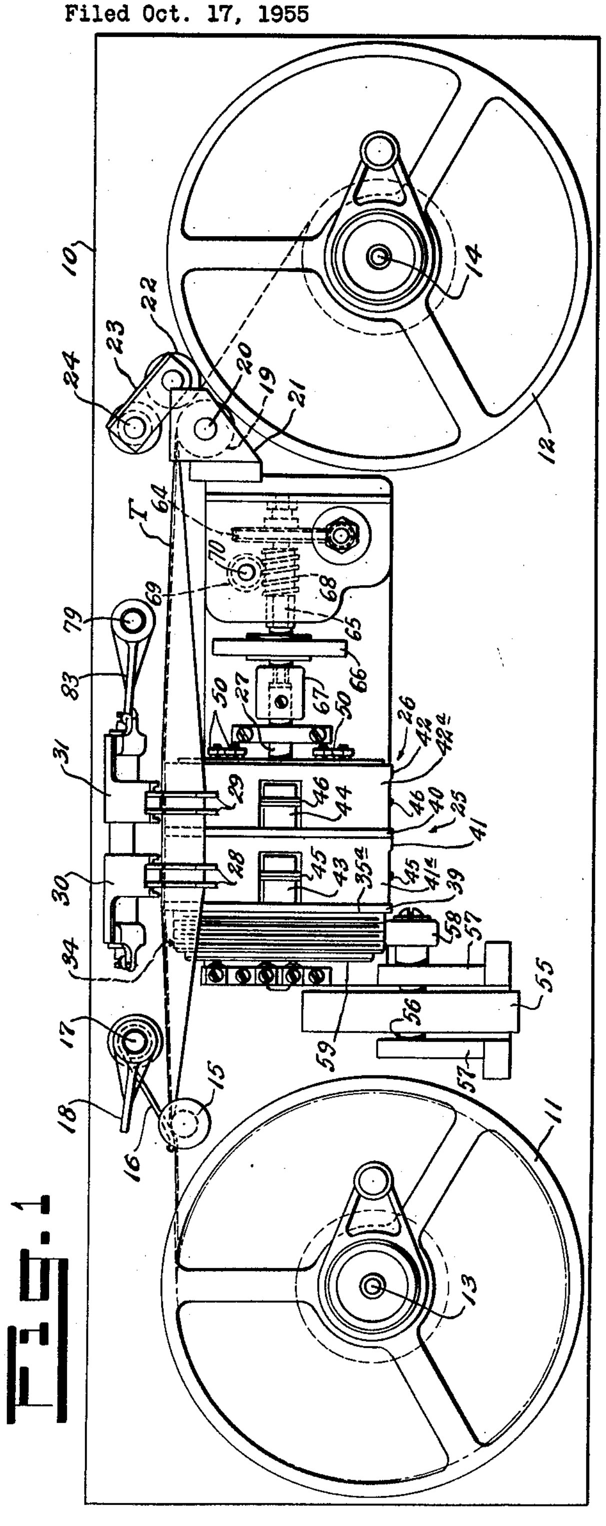
Fig. 1 represents a side view of a magnetic tape recording apparatus embodying the present invention.
Figure 8:
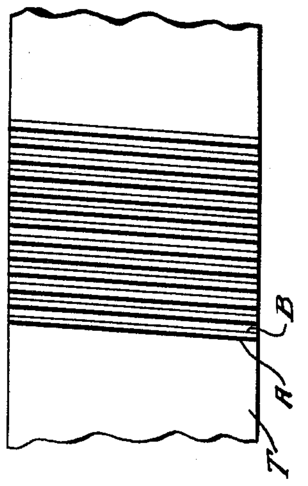
Fig. 8 is a plan view of a portion of a wide magnetic tape showing two sets of interrupted alternating sound tracks corresponding to a pair of channels which have been simultaneously recorded by the apparatus disclosed herein.

The present invention relates to an improvement over a co-pending application of William H. Lyon, Serial Number 406,517, filed January 27, 1954, entitled Transverse Interrupted Track Magnetic Recorder With Transducer Head Drum on a Horizontal Axis.

In the present apparatus, two sound tracks are adapted to be recorded on a single wide magnetic tape by two sets of transducing means, each of which comprises four uniformly spaced transducer heads which project through the outer rim of a rotating drum, a pair of said drums being mounted on a common rotating horizontal shaft beneath said tape.

The size of the drums will be such that when one of the transducer heads is just leaving one edge of the tape, the next head will be just reaching the other edge of said tape.

By means of a pair of concave tape holding shoes, the tape will be curved to closely embrace the tips of the transducer heads on the cylindrical drums located beneath said shoes.

Referring now to the drawings in which like reference numerals denote corresponding parts throughout the several views, the numeral 10 indicates a vertical chassis plate upon which is mounted on horizontal axes a tape feed reel 11 and a takeup reel 12. The feed reel 11 is carried by a spindle 13, and the takeup reel 12 by a spindle 14.

After the tape T passes from the feed reel 11, it moves over a tape guide drum 15, against which it is pressed by a tension shoe 16 pivotally mounted on a pin 17 carried by the chassis plate. In order to release the tape tension shoe 16 whenever desired, provision is made of a handle 18.

On the other end of the chassis plate 10, provision is made of a drive roller 19 mounted on a shaft 20 carried by a bracket 21. While passing over the drive roller, the tape is engaged by a pressure roller 22 mounted on an arm 23 carried by a pivot 24.

The two channels "A" and "B" of this dual apparatus are adapted to be recorded and reproduced by means of two head-holding drums 25 and 26 respectively.

Figure 4:
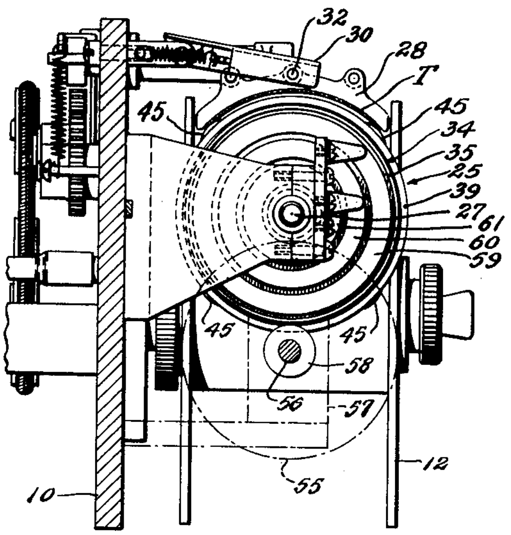
Fig. 4 is a cross-sectional view, taken along the line 4—4 of Fig. 2.
Figure 5:
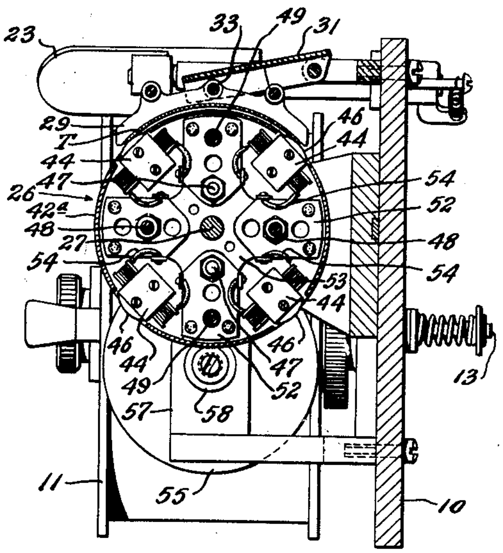
Fig. 5 is a cross-section, taken along the lines 5—5 of Fig. 2.
Figure 6:
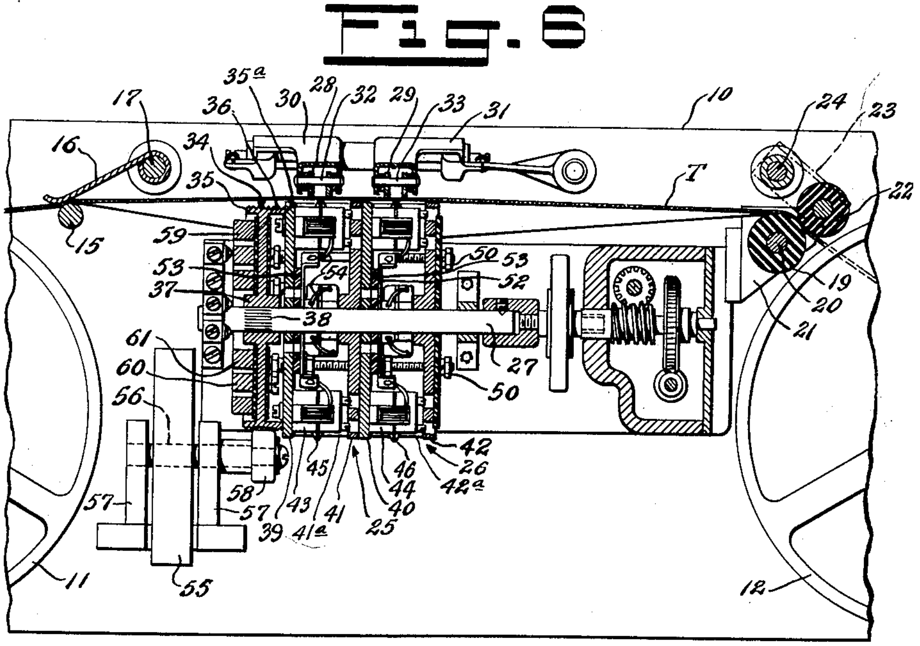
Fig. 6 is a fragmentary vertical sectional view of the recording drums, the pressure shoes and the mechanism associated therewith.

Both of the drums 25 and 26 are rigidly mounted on a horizontal longitudinal continuously rotating shaft 27, and the tape T is pressed resiliently against said drums by a pair of arcuate tape-holding shoes 28, 29 pivotally mounted on a pair of supporting brackets 30, 31 by a pair of pins 32, 33 as clearly shown in Figs. 4, 5, and 6.

An electric motor 63 for rotating the shaft 27 is secured to the rear of the vertical chassis plate 10. The output shaft of the motor 27 extends through to the front of the chassis plate 10 and drives a vertical worm gear 64. The worm gear 64 is fixed to a horizontally journalled shaft 65 which is provided with a fly-wheel 66 and which is connected by a coupling 67 to the shaft 27.

Figure 3:
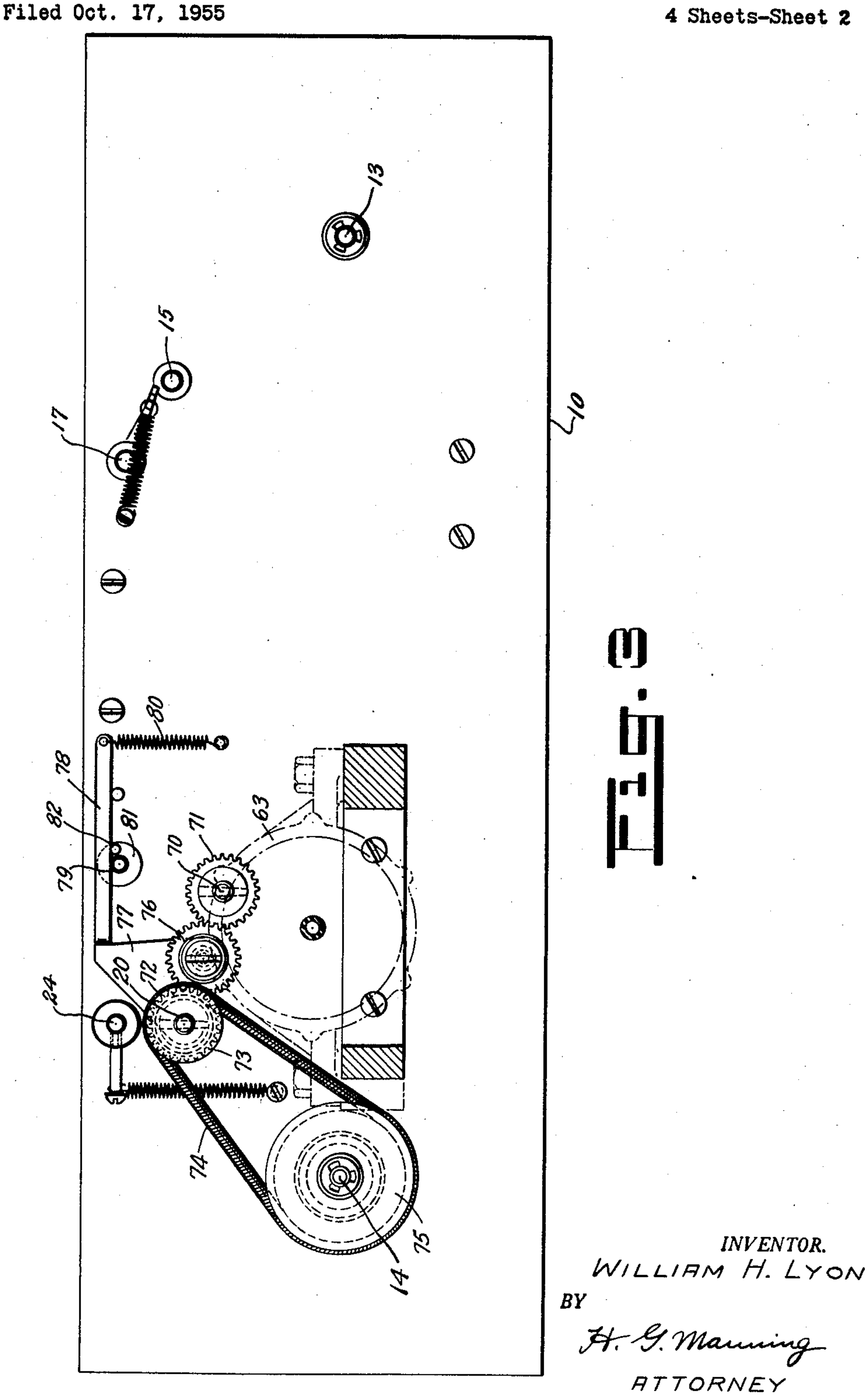
Fig. 3 is a vertical sectional view of the same, taken along the line 3—3 of Fig. 2, looking in the direction of the arrows.
Figure 2:
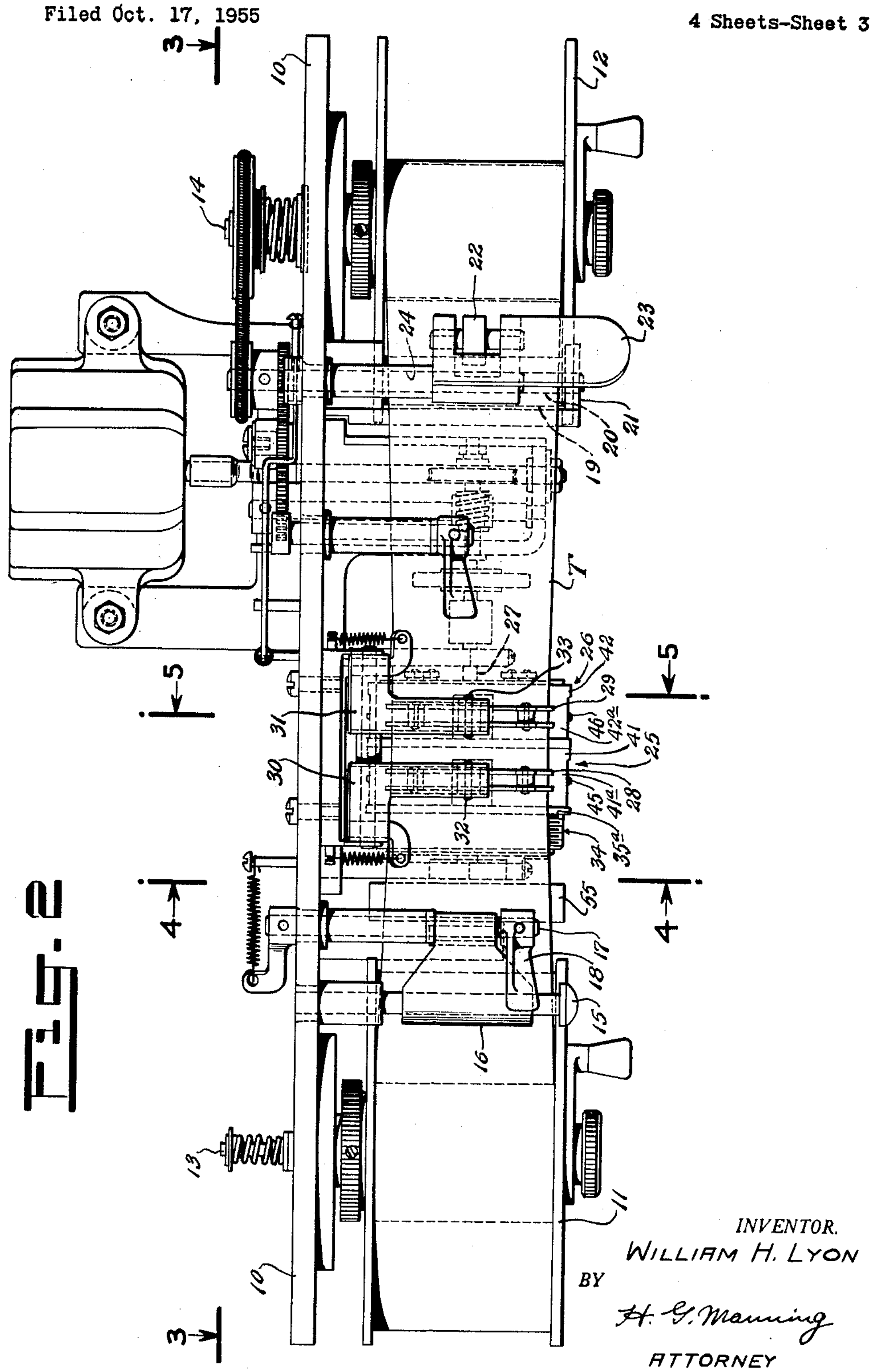
Fig. 2 is a top view of the same.

The shaft 65 carries a worm 68 which is in mesh with a worm gear 69 secured to the end of a tape drive shaft 70 extending through the chassis plate 10. A tape drive gear 71 is secured to the rear end of the shaft 70 (see Fig. 3).

The tape drive shaft 20 extends through the rear of the panel 10 and has secured thereon a gear 72. Also secured on the shaft 20 is a pulley 73 which connects by means of a spring belt 74 with a pulley 75 at the rearwardly-extending end of the take-up spindle 14.

Arranged in intermeshing engagement between the gears 71 and 72 is an idler gear 76, which is rotatably mounted on a swingable plate 77 which is pivoted at one side about the shaft 20. The plate 77 is provided with a horizontally-extending arm 78 which is resiliently pressed downwardly in the direction of a cam shaft 79, extending through the back of the panel 10, by means of a tension spring 80. Secured on the cam shaft 79 is a cam 81 having an outwardly-projecting eccentrically disposed pin 82 adapted to raise the arm 78 when said cam shaft is turned, for which purpose a lever 83 is secured to the front end of said cam shaft (see Fig. 1). It will thus be apparent the motor 63 will actuate the tape drive roller 20 and the take-up spindle 14 through the idler gear 76, and that the angular relationship between said tape drive roller and the horizontal shaft 27 carrying the head drums 25 and 26 can be adjusted by means of the cam shaft lever 83.

At the left hand portion of the head drums, as viewed in Fig. 1, provision is made of a cylindrical grooved ring 34 having a pair of outer flanges 35, 36 of cylindrical shape, the radial surface 35a at the end of the flange 36 being very accurately machined to be at right angles to the axis of the shaft 27.

The ring 34 is provided with a hollow central hub 37, (Fig. 6) which has a force fit upon a plurality of longitudinal ribs 38 formed on the shaft 27.

Provision is also made of a pair of circular wafer disks 39, 40, which are surrounded by a pair of spacer shells 41, 42. The wafer disks 39, 40 serve as mountings for two sets of magnetic heads 43, 44 (four in each instance) having pole tips 45, 46, which project through the outer cylindrical walls, 41a, 42a of said spacer shells 41, 42 into contact with the tape T, which is pressed against said heads by the shoes 28, 29.

Figure 7:
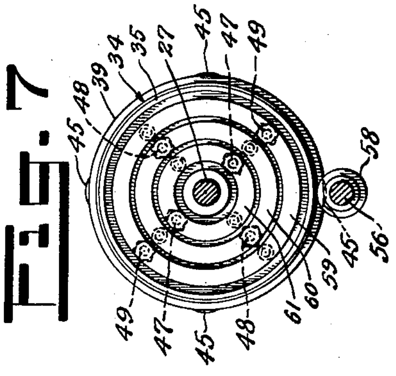
Fig. 7 is an end view of the recording head and slip rings, and a section taken through the driving shaft.

Provision is also made of a plurality of four sets of horizontal inner studs 47, intermediate studs 48 and outer studs 49. (See Figs. 5 and 7.)

The studs 47, 48, 49 are threaded on their ends, and are adapted to receive nuts 50, for securing the assembled parts of the dual channel mechanism rigidly upon the shaft 27.

Each of the wafer disks 39, 40 is provided with a plurality of radial contact plates 52 and a cross-shaped insulating disk 53, the contact plates 52 being joined by wires 54 leading to the transducer heads 43, 44. (See Fig. 5.)

Provision is also made of a flywheel 55 mounted on a shaft 56, and rotating at a more rapid speed than said shaft 27. The flywheel shaft 56 is mounted in a pair of brackets 57, and carries a soft rubber wheel 58 which engages the exterior of the grooved flanges 35, 36 of the ring 34, whereby a more positive contact with the rubber wheel 58 is produced and mechanical flutter will be eliminated.

Provision is also made of three slip rings 59, 60, 61 mounted in the left-hand side of the cylindrical ring 34 for supplying current to the transducer heads 43, 44.

Furthermore, it should be noted that the use of the above-described apparatus is not limited to the recording or reproducing of two channels of intelligence only, but could also be used with a single rotating transducing means to record only one track or, depending on the practicability of mounting more than two transducing means for common operation, could be used to record and reproduce more than two channels of intelligence. The transducing means is more particularly described and claimed in my copending application, filed October 3, 1955, Serial Number 538,151, entitled "Head Drum Assembly for Magnetic Tape."

*Operation*

It will be understood that the magnetic heads 43, 44 may be easily replaced when they wear out, because of the fact that the operating parts of the drum assemblies including the wafer disks and the spacer shells are interchangeable and detachable from the horizontal shaft 27.

Moreover, the wafer disk 39 will fit firmly against the vertical reference surface 35a of the ring 34, and the spacer shell 41 will be slid upon the shaft 27 to cover the heads 43 whereby a smooth cylindrical outer surface is provided for engagement with the curved tape T during the operation of the apparatus.

The wafers and spacer shells will be held rigidly in position on the shaft 27 by the horizontal studs 47, 48, 49 and the nuts 50.

The intermediate slip ring 60 is common, and the inner slip ring 61 is connected to the heads 43 of channel A, while the outer slip ring 59 is connected to the heads 44 of channel B.

The connection from the common slip ring 60 to both sets of the heads 43, 44 is made electrically through the intermediate studs 48.

The radial contact plates 52 serve as convenient terminal points for the wires 54 which connect the studs 47, 48, 49 to the heads and the slip rings 59, 60, 61 respectively.

While there has been disclosed in this specification one form in which the invention may be embodied in practice, it is to be understood that this form is shown for the purpose of illustration only and that the invention is not limited to the specific disclosure, but may be modified and embodied in various other equivalent forms without departing from its spirit. In short, the invention includes all the modifications and embodiments coming within the scope of the following claims.

Having thus fully described the invention what is claimed as new and for which it is desired to obtain Letters Patent is:

1. In an apparatus for recording intelligence upon and reproducing it from a longitudinally moving wide flexible magnetically coated tape passing continuously from a feed reel to a take-up reel, a chassis upon which said reels are mounted, a continuously rotating longitudinal shaft mounted on said chassis, a pair of cylindrical drums rigidly mounted on said shaft for rotation therewith, each drum carrying a set of spaced transducer heads, and means simultaneously to magnetically record upon, and reproduce from said tape a pair of alternating transverse tracks from two separate sources of intelligence.

2. The invention as defined in claim 1, in which said tape is resiliently held against said drums by a pair of curved shoe members pivotally mounted above said tape.

3. The invention as defined in claim 1, in which means are provided to adjust the tape longitudinally with respect to said transducer heads for proper playback.

4. In an apparatus for recording upon and reproducing intelligence from a flexible magnetic tape, the combination comprising a mounting chassis, a tape feed reel supporting a roll of magnetic tape mounted on one end of said chassis, a tape take-up reel mounted on the other end of said chassis, drive mechanism for continuously passing said tape from said tape feed reel to said tape take-up reel, a pair of cylindrical drums rotatably mounted on a longitudinal horizontal axis parallel to the direction of tape travel, each of said drums having a plurality of transducer heads equidistantly spaced about and protruding through the peripheral walls of said drums, and means including said transducer heads to magnetically record a succession of alternate transverse tracks upon said tape from two separate sources of intelligence.

5. An apparatus for recording intelligence on magnetic tape, the combination comprising means to move said tape longitudinally at a predetermined rate of speed, a first transducer means movable transversely with respect to said tape at a predetermined rate of speed to provide transverse spaced paths of intelligence continuously recorded from a first signal source, a second transducer means spaced from said first transducer means longitudinally with respect to said tape, and movable transversely with respect to said tape at a predetermined rate of speed to provide transverse spaced paths of intelligence continuously recorded from a second signal source, and means to correlate said rates of speed of said tape and said first and second transducer means, whereby the successive paths of intelligence generated by the first transducer means are spaced from the successive paths of intelligence generated by the second transducer means.

6. The invention defined in claim 5, wherein the transducer heads of said first and said second transducer means are rotatable about a common axis and said apparatus includes common drive means to move said tape and to rotate said transducer heads about said common axis.

7. In an apparatus for recording intelligence upon and reproducing it from a longitudinally moving wide flexible magnetically coated tape passing from a feed reel to a take-up reel, a chassis upon which said reels are mounted, a continuously rotating longitudinal shaft mounted on said chassis, a pair of drums mounted in spaced relation upon said shaft, each drum carrying a set of spaced transducer heads, means simultaneously to magnetically record upon, and reproduce from said tape a pair of alternating transverse tracks from two separate sources of intelligence, and mechanism cooperative with the rotation of said shaft for longitudinally moving said tape, said mechanism comprising a train of gears, an intermediate one of said gears being mounted on a swingable plate having manually controlled means to adjust the angular position thereof, whereby said tape may be adjusted longitudinally with respect to said heads.

8. In an apparatus for recording sound upon and reproducing it from a longitudinally moving wide fleible magnetic tape passing continuously from a feed reel to a take-up reel, a chassis upon which said reels are rotatably mounted, a continuously rotating longitudinal shaft mounted on said chassis between said reels, a pair of transducer head drums mounted in spaced relation from each other upon said shaft for rotation with said shaft, each of said drums comprising an interchangeable wafer disk slidably fitted on said shaft and supporting a plurality of circumferentially spaced transducer heads, a spacer shell surrounding each of said disks, a cylindrical ring member fixed to said shaft and having a flat surface perpendicular to the axis of rotation of said shaft, and screw means interconnecting said disks and said shells for rigidly securing them against said flat surface for rotation with said shaft; said heads projecting through openings in said shells into contact with said tape.

References Cited in the file of this patent

UNITED STATES PATENTS

| | | |
|---|---|---|
| 2,245,286 | Marzocchi | June 10, 1941 |
| 2,352,023 | Schuller | June 20, 1944 |
| 2,648,589 | Hickman | Aug. 11, 1953 |
| 2,762,861 | Somers | Sept. 11, 1956 |
| 2,773,120 | Masterson | Dec. 4, 1956 |